(12) United States Patent
Stevens

(10) Patent No.: US 7,819,469 B2
(45) Date of Patent: Oct. 26, 2010

(54) EXPLOSION INDUCED G-FORCE ABSORPTION APPARATUS

(75) Inventor: Robert Stevens, Tacolneston (GB)

(73) Assignee: Jankel Armouring Ltd. (GB)

( * ) Notice: Subject to any disclaimer, the term of this patent is extended or adjusted under 35 U.S.C. 154(b) by 203 days.

(21) Appl. No.: 12/148,689

(22) Filed: Apr. 22, 2008

(65) Prior Publication Data

US 2009/0066126 A1 Mar. 12, 2009

(30) Foreign Application Priority Data

Sep. 6, 2007 (GB) ................ 0717311.5
Apr. 1, 2008 (GB) ................ 0805836.4

(51) Int. Cl.
*B60N 2/42* (2006.01)
*B60R 21/00* (2006.01)

(52) U.S. Cl. .............. 297/216.13; 297/216.1; 297/216.14

(58) Field of Classification Search ........ 297/216.1, 297/216.13, 216.14, 216.15, 216.16; 280/777; 244/122 R See application file for complete search history.

(56) References Cited

U.S. PATENT DOCUMENTS

| 2,102,979 | A | * | 12/1937 | Smith ................. 297/216.19 |
| 4,027,905 | A | * | 6/1977 | Shimogawa et al. ........ 297/472 |
| 4,358,154 | A | | 11/1982 | Campbell |
| 4,474,347 | A | | 10/1984 | Hazelsky |
| 5,273,240 | A | | 12/1993 | Sharon |
| 5,487,562 | A | * | 1/1996 | Hedderly et al. ............ 280/777 |
| 6,378,939 | B1 | | 4/2002 | Knoll |
| 6,394,393 | B1 | | 5/2002 | Mort |
| 6,820,931 | B2 | | 11/2004 | Ruff et al. |
| 6,896,324 | B1 | | 5/2005 | Kull et al. |
| 7,445,181 | B2 | * | 11/2008 | Knoll et al. ............. 244/122 R |

FOREIGN PATENT DOCUMENTS

| FR | 2162940 | 7/1973 |
| GB | 2397865 A | 8/2004 |
| WO | WO2006/037314 A1 | 10/2005 |
| WO | WO2007/060405 A3 | 11/2006 |

* cited by examiner

*Primary Examiner*—Sarah B McPartlin
(74) *Attorney, Agent, or Firm*—Berliner & Associates

(57) ABSTRACT

Energy absorption apparatus for protecting occupants from excessive G-force by absorbing energy during an explosion below the vehicle. A mitigating strip and an anvil are attached by first and second mounting members between the vehicle and the occupant's seat whereby an excessive G-force on the first mounting member bends the mitigating strip and pulls it over the anvil. A portion of gradually increasing resistance to bending is provided between one end of the strip and the portion of constant resistance to bending whereby the mitigating strip increasingly resists bending over the anvil as the portion of gradually increasing resistance is pulled over the anvil until the portion of constant resistance to bending reaches the anvil; the resistance to bending of the mitigating strip will then remain constant as it is pulled over the anvil.

14 Claims, 6 Drawing Sheets

EXPLOSION INDUCED G-FORCE ABSORPTION APPARATUS

The present invention relates to explosion induced G-force absorption apparatus, particularly, G-force absorption apparatus for protecting an occupant from excessive G-force by absorbing energy imparted on a vehicle chassis during an explosion occurring beneath the vehicle.

In hostile environments there is a possibility of vehicles being inadvertently driven over explosive devices hidden in the ground. If this happens the explosive device will normally explode which can pose a serious danger to the vehicle occupant(s).

In order to minimise the danger to an occupant from such explosions there are four key problems which must be addressed as follows:—

1) Pressure wave. The pressure wave produced by the explosion affects everything in the path of the explosion and cannot be avoided, although the structure of the vehicle can help to minimise the exposure of the occupant to the pressure wave;

2) Blast effect. This includes the smoke and flames caused by the explosion and can be deflected away from the occupant using deflection technology (for example, an appropriately shaped underside of the vehicle chassis);

3) Shrapnel. Typically, shrapnel is emitted by the explosion or in direct consequence of the explosion. Appropriate armouring can be used to protect the occupant from shrapnel.

4) G-force. The explosion will cause the vehicle to accelerate away from the source of the explosion very rapidly. If the explosion occurs beneath the vehicle, the main component of acceleration will be upward. This causes the vehicle occupant to be subjected to a corresponding upward force which is perceived by the occupant as a tremendous G-force into the seat. Even if each of factors 1 to 3 are survivable, there will be fatal consequences for the occupant if the level of G-force experienced by the occupant is too high.

One attempt at reducing the G-force experienced by the occupant in an explosion is to provide a crumple zone beneath the occupant's seat. The crumple zone comprises a series of metal sheets which combine to provide a "honeycomb" arrangement. In the event of the explosion, the "honeycomb" arrangement crumples in order to absorb a portion of the acceleration forces. One problem with this arrangement is that there is a lack of control/adjustment of the degree by which the crumple zone deforms. Another problem with this arrangement is that it can require a relatively large amount of space to be occupied below the occupant seat for its installation which can result in dissatisfaction in the user and or further consequential modifications to other components of the vehicle being required.

According to the present invention there is provided explosion induced G-force absorption apparatus for reducing the G-force imparted on a vehicle occupant below that of the vehicle, the G-force absorption apparatus comprising:

a first mounting member attached to the vehicle;

a second mounting member attached to the occupant's seat;

an absorption mechanism attached between the first and second mounting members, wherein the absorption mechanism comprises at least a mitigating strip provided on one of the mounting members and an anvil provided on the other of the mounting members such that when the vehicle, and hence the first mounting member, is subjected to an explosion induced G-force, the mitigating strip is pulled over the anvil. As it does this is it inherently must simultaneously bend. This bending action requires energy which is received from the relative movement of the seat and the frame thereby absorbing a portion of the G-force in order to reduce the G-force experienced at the second mounting member and hence the occupant's seat.

A plurality of spaced apart anvils may be provided in order to increase the degree of bending required by the mitigating strip as it passes over the anvil. In a preferred embodiment three spaced apart anvils may be provided and the mitigating strip woven over one side of the first anvil, under the other side of the second anvil and over the opposite side of the third anvil. This provides improved consistency in the rate of movement of the mitigating strip past the anvil in an explosion event.

The plurality of anvils may be provided as a pair of anvils on either of the mounting members and an intermediate third roller on the other of the mounting members.

The or each anvil may comprise a cylindrical roller rotatable about a central axis as the mitigating strip passes over the surface of the or each anvil.

The apparatus may also be provided with guide means, optionally in the form of guide rollers adapted to run along a guide track in order to assist controlled relative movement of the first and second mounting members. The guide means may be provided toward a lower part of the apparatus in order to guide the lower part during movement.

The mitigating strip may be anchored toward an upper part of the first or second mounting member and woven through the or each anvil provided on the first and second mounting members. Optionally, the mitigating strip may also be anchored toward a lower part of the first or second mounting member.

The mitigating strip may preferably be of a dimension and material which bends past the or each anvil when an explosion induced G-force is imparted on the vehicle but maintains the first and second mounting members in substantially fixed relationship when no such explosion induced G-force is present. In other words, when no explosion has been encountered the inter-engagement between the mitigating strip and the or each anvil will support the second mounting member and hence the occupant seat without relative movement between the first and second mounting members occurring.

Optionally, the cross sectional area of the mitigating strip may be non-uniform along the strip's length such that there exists a variation in resistance to bending of the mitigating strip material over the or each anvil. The non-uniform cross sectional area may be provided by a non-uniform strip width.

Preferably, the non-uniform strip width comprises a mean strip width portion having a portion of gradually reducing strip width which reaches a minimum strip width before gradually increasing back toward the mean strip width.

The first mounting member may comprise a support frame rigidly fixed to a portion of the vehicle chassis and the second mounting member may comprise a seat back frame forming a portion of the occupant's seat.

The energy absorbed by the present invention may comprise a G-force in the form of an upward acceleration force caused by an explosion and resulting blast occurring below the vehicle chassis.

The first and second members may be aligned with one another along an axis which is angled relative to the vertical axis.

Embodiments of the invention will now be described, by way of example only, with reference to the drawings, in which:—

Figure 1:
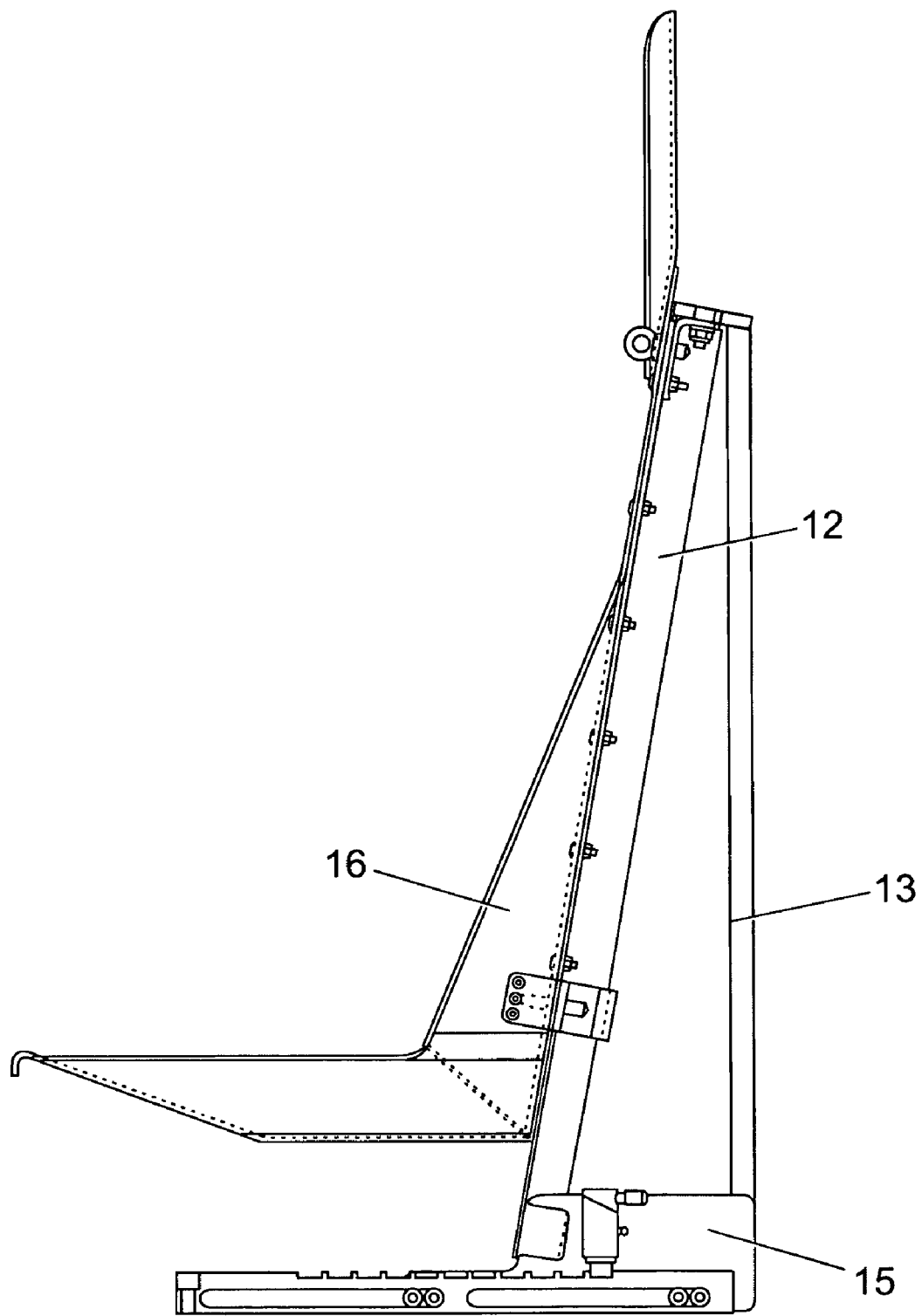
FIG. 1 is a schematic side view of an occupant seat on which energy absorption apparatus according to the present invention is installed.
Figure 2:
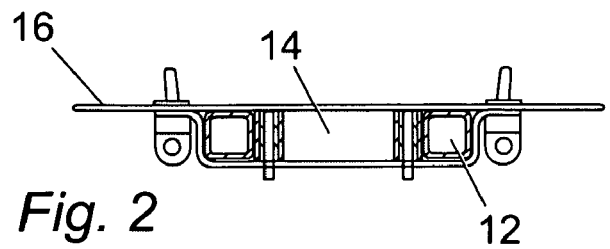
FIG. 2 is a top view of the occupant seat shown in FIG. 1.
Figure 3:
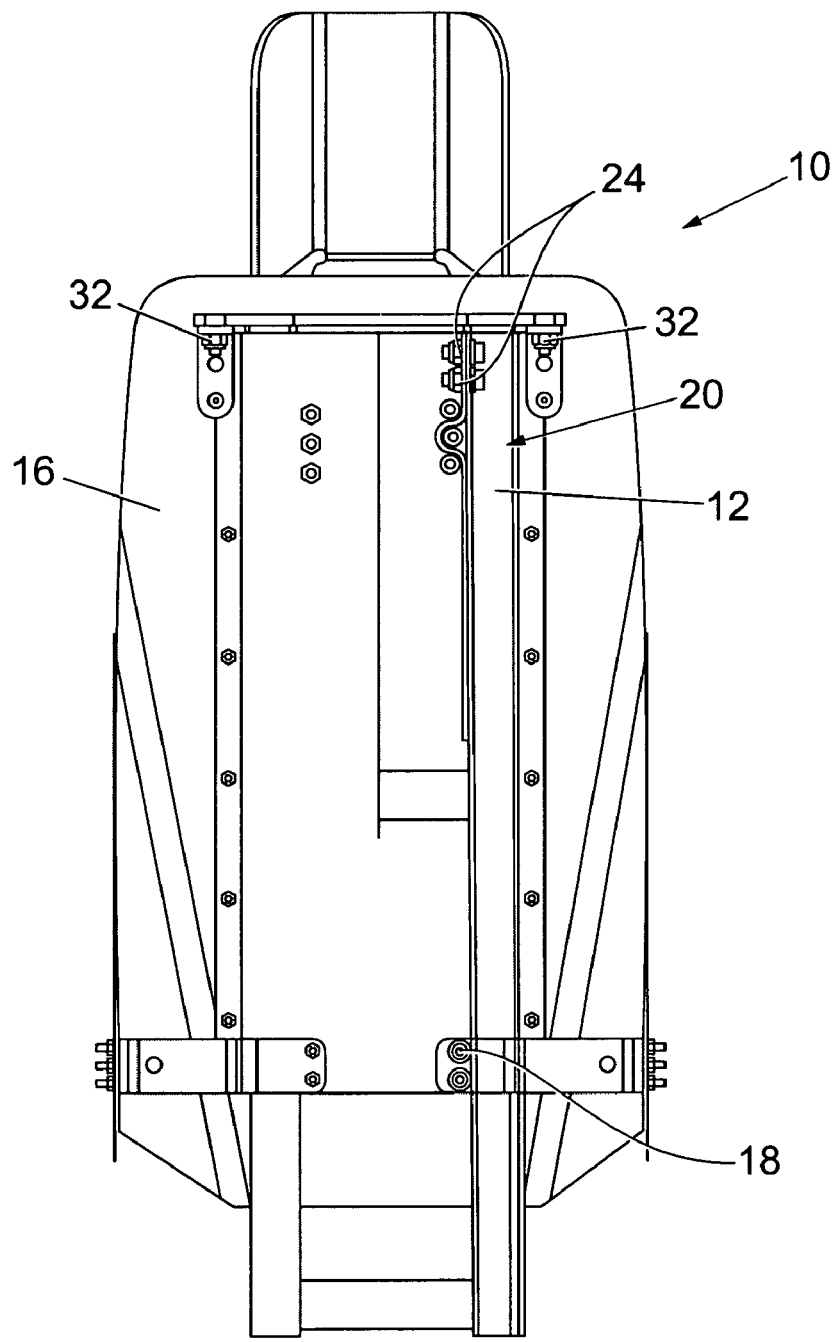
FIG. 3 is a rear view of the occupant seat of FIGS. 1 and 2 where the energy absorption apparatus of the present invention is shown installed at the rear of the seat. The seat in FIG. 3 is shown prior to an explosion event.
Figure 5:
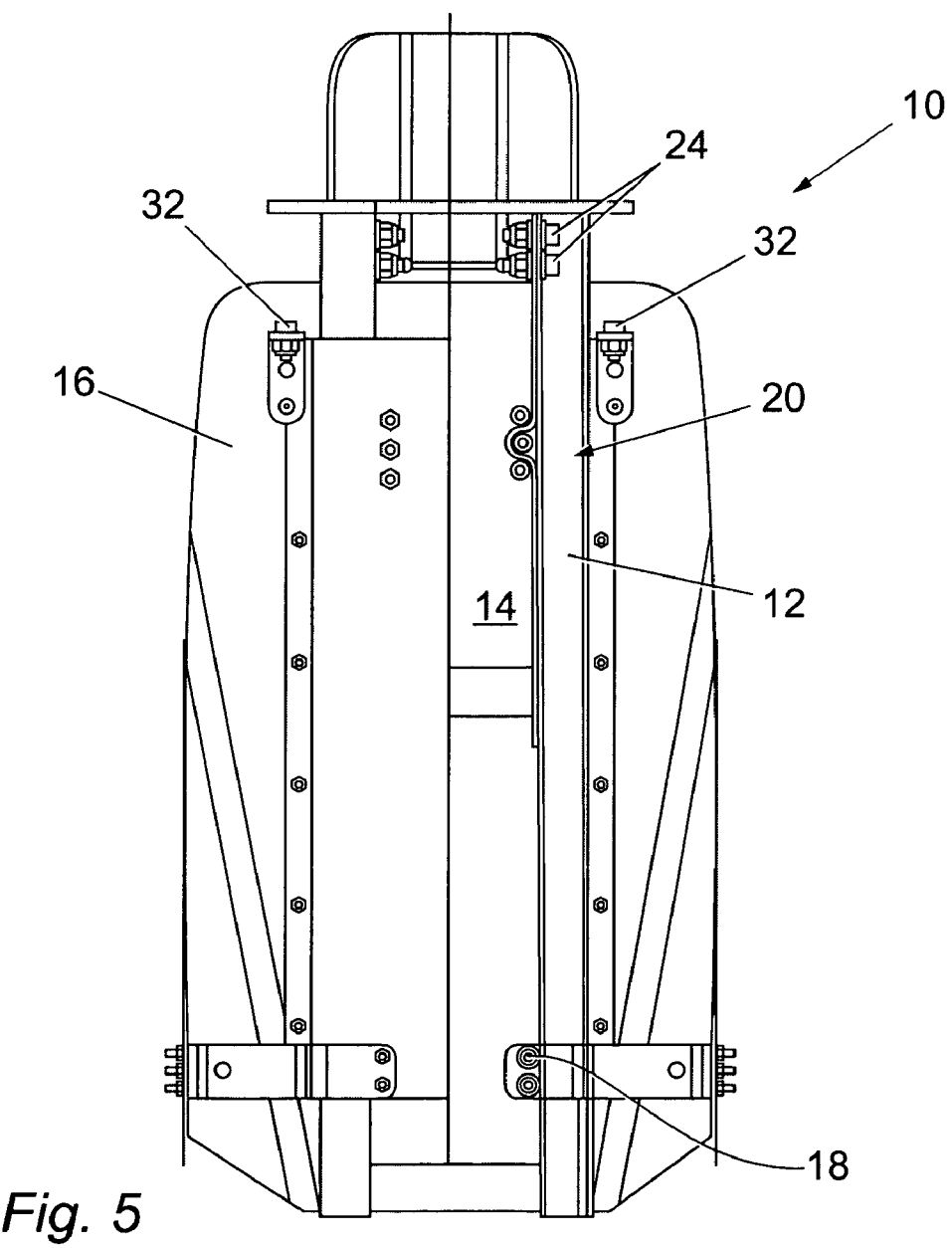
FIG. 5 is a view of the seat of FIG. 3 where the seat position is shown subsequent to an explosion event.
Figure 6:
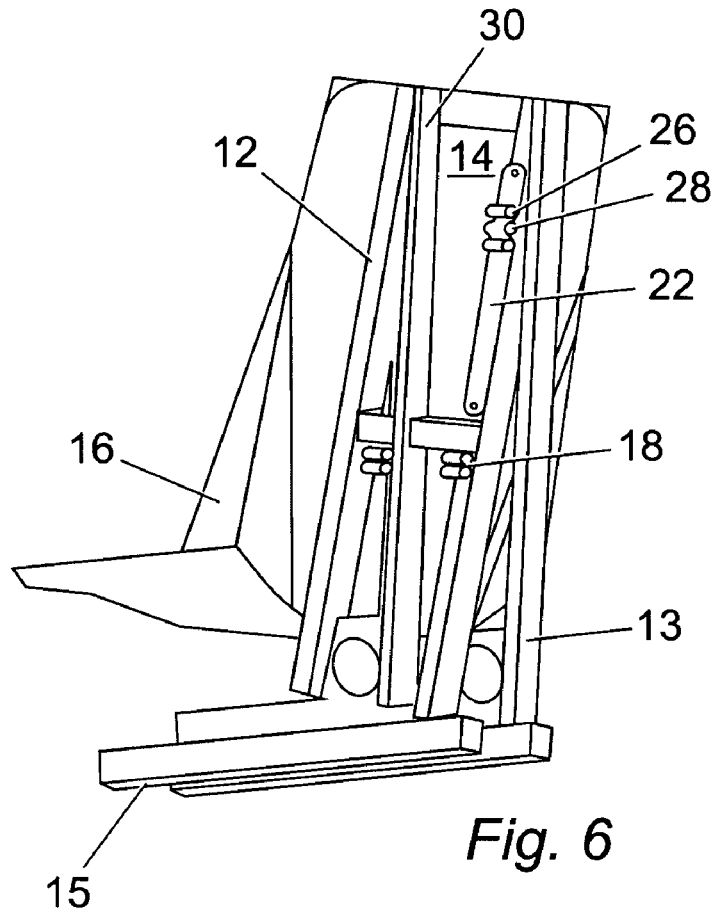
FIG. 6 is a perspective schematic view of the rear of the seat and absorption apparatus.
Figure 7:
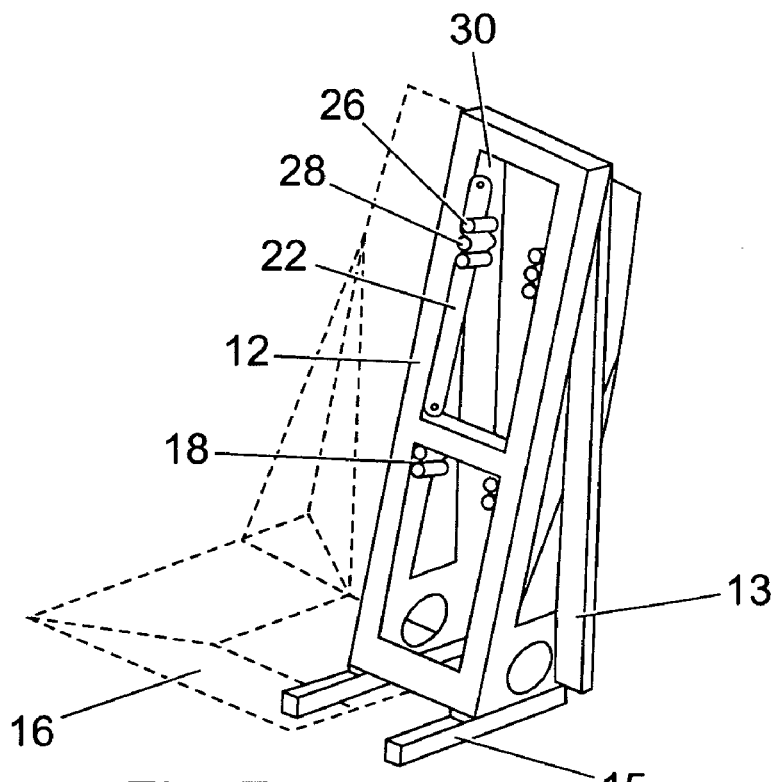
FIG. 7 is a perspective schematic (partial cutaway) view of the front of the seat and absorption apparatus.

Energy absorption apparatus 10 is, provided between a first mounting member, in the form of a support frame 12, and a second mounting member, in the form of seat back frame 14 (shown in partial cross section in FIGS. 3 and 5). The support frame 12 is rigidly fixed to the vehicle chassis (not shown) and the seat back frame 14 is rigidly connected to the occupants' seat assembly 16. A brace support 13 extends from a chassis mounting 15 to the top of the support frame 12 in order to provide re-enforcement thereto.

Cylindrical guide rollers 18 are also provided toward the bottom of the support frame 12. Guide tracks (not shown) co-operable with the guide rollers 18 may also be provided.

The absorption mechanism 20 has a mitigating strip 22 which is anchored to the support frame 12 by a pair of bolts 24. The mitigating strip 22 is selected during manufacture to be of a material and dimension which requires an appropriate amount of force to be exerted upon it in order to bend it around the anvils.

First, second and third anvils 26, 28 and 30 respectively are provided on the seat back frame 14. The anvils are spaced apart from one another to allow the mitigating strip to be woven under the first anvil 26 over the second anvil 28 and under the third anvil 30.

The anvils 26, 28, 30 are cylindrical members which are rotatably mounted on their respective axes in order to provide rollers over which the mitigating strip may pass.

In use, when the vehicle in which the apparatus is installed is being operated in normal conditions (i.e. when no explosion has occurred) no bending of the mitigating strip 22 occurs. The occupant seat 16 is therefore held in a fixed position relative to the support frame 12 of the vehicle. In this regard, the weight of the occupant is transferred through the mitigating strip 22 and bears onto the anvils 26, 28, 30. At this time, the seat 16 and support frame 12 will be in the position depicted in FIG. 3 (note that the bolts 24 and anvils 26, 28, 30 are adjacent each other at this time). Dowels 32 are also provided to assist locating either side of the seat back frame 14 in normal operational engagement with either side of the support frame 12.

Figure 4:
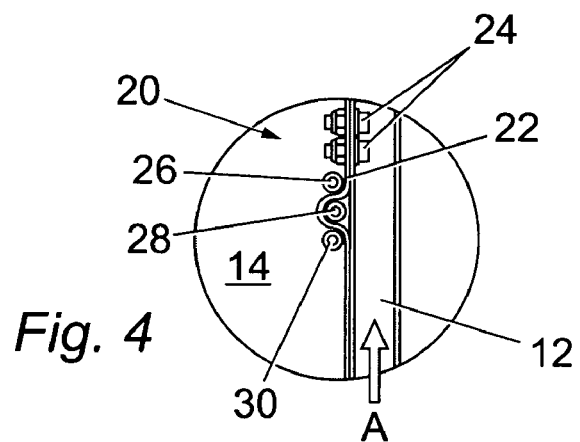
FIG. 4 is a close up view of the energy absorption apparatus of the present invention installed at the rear of the occupant seat.

In the event of an explosion beneath the vehicle, the vehicle and support frame 12 will be accelerated upwards with an explosion induced G-force depicted by arrow A in FIG. 4. This force causes the mitigating strip 22 to begin bending through the anvils 26, 28, 30. Bending of the strip 22 involves the strip 22 being drawn through the anvils. In this regard, as the strip progresses through the anvils it is bent under anvil 26, over the top of anvil 28 and under anvil 30. Effectively, the first anvil 26 bends the strip 22 away from the support frame 12, the second anvil 28 bends it back toward the support frame 12 and the third anvil then straightens it again, in line with the support frame 12.

A portion of the acceleration induced G-force acting on the support frame 12 is therefore absorbed by the bending/straightening action of the mitigating strip 22 over the anvils 26, 28, 30. This results in a reduced G-force being subjected to the seat 16 and hence the occupant.

At the same time, since under the explosion induced G-force the connection between the support frame 12 and the seat back frame 14 is no longer rigid, the seat 16 will displace downwardly in the direction of arrow B (FIG. 5) relative to the support frame 12. Note that dowels 32 simultaneously disengage the seat back frame 14 from the support frame 12.

The G-force will eventually begin to decrease towards the end of the explosion event and/or as the vehicle is propelled away from the source of the explosion. Eventually G-force A will decrease to a value which is not sufficient to continue bending the strip 22 between the anvils 26, 28, 30 at which point the seat 16 will cease moving relative to the support frame 12. The final position of the seat 16 relative to the support frame 12 is illustrated in FIG. 5. In this position note that the bolts 24 are no longer directly adjacent the anvils 26, 28, 30.

During the stroke of the seat 16 relative to the support frame 12, the absorption mechanism 10 therefore distributes the acceleration force over time so that the instantaneous acceleration force experienced at the seat, and therefore the G-force experienced by the occupant is lower than would otherwise be experienced if the seat were rigidly attached to the vehicle chassis. This can be tuned during manufacture such that the G-force experienced by the occupant is survivable.

Figure 8C:
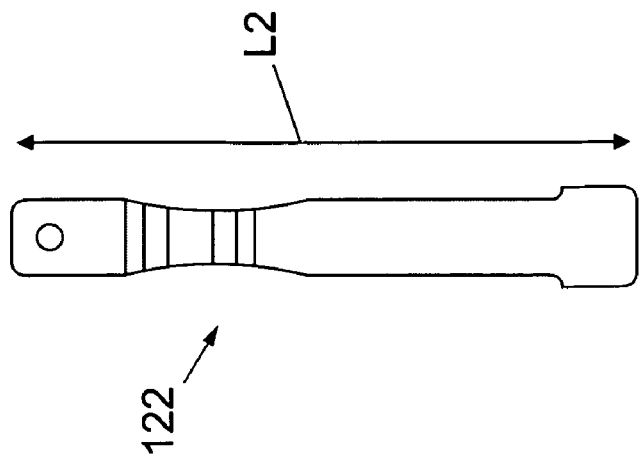
FIG. 8C is a front view of the strap of FIG. 8B.
Figure 8B:
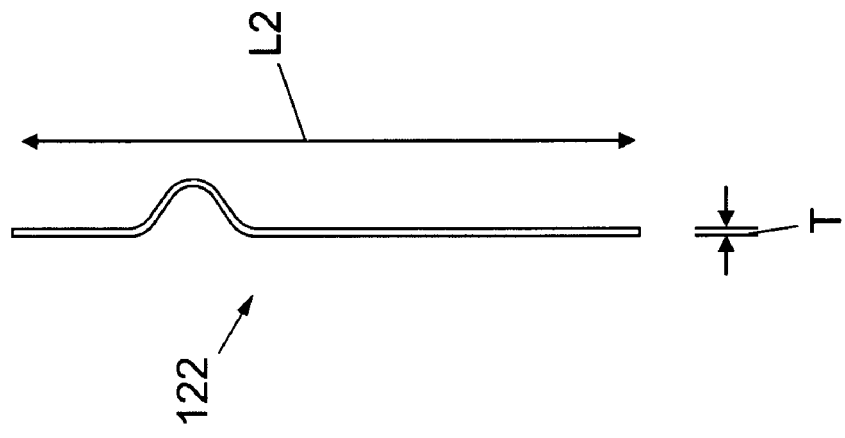
FIG. 8B is a side view along the long edge of the strip of FIG. 8A after an explosion event, where the overall length of the strip is greater than that of FIG. 8A.
Figure 8A:
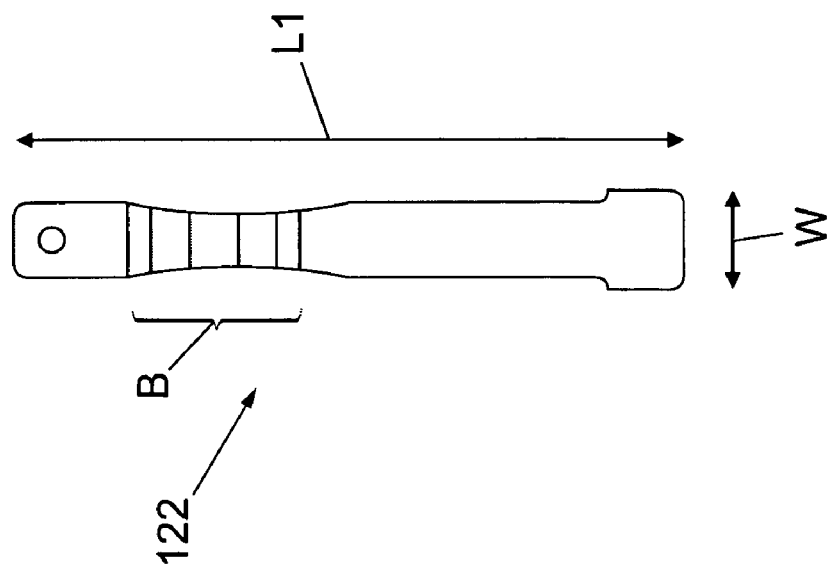
FIG. 8A is a front view of a modified mitigating strip prior to an explosion event.

With reference to FIGS. 8A to 8C, an alternative embodiment of the present invention will now be described. The features of this embodiment which are not described subsequently are substantially similar to the first embodiment; therefore they will not be described any further.

In the embodiment shown in FIGS. 8A to 8C, the width W of the mitigating strip 122 varies along its length L1, particularly in the region indicated at B. In this regard, it can be seen that (progressing from the bottom of the mitigating strip 122 toward the top) the width W of the mitigating strip gradually decreases approaching the centre of region B and then begins to increase again toward the top of the mitigating strip 122. With reference to FIG. 8B, the thickness T of the strip 122 is substantially constant along the mitigating strip's length.

This variation in width W along the length of the mitigating strip 122 is desirable because the initial force necessary to set the seat in motion is greater than the force necessary to maintain its movement. Therefore, although in the previous embodiment the uniformly wide mitigating strip 22 does control movement of the seat to a certain degree, the seat does not move at a constant speed. However, in the present embodiment, the mitigating strip 122 has a narrower width W at the point where it first meets the anvils 26, 28 30. This provides a relatively low level of resistance against movement of the seat at the point in the seat stroke where the force required to move the seat is at its greatest (i.e. at the start of the seat stroke). Furthermore, since width W then begins to increase further along its length, as the seat strokes away from the initial starting position (and the movement required to move the seat further along its stroke decreases) the resistance against movement increases. It can therefore be seen that the movement of the mitigating strip through the anvils 26, 28, 30 is continually controlled so as to achieve more evenly controlled acceleration of the seat. It can also be seen that after the explosion event, the overall length of the strip 122 has increased from L1 (FIG. 8A) to L2 (FIG. 8B and 8C).

It should be noted that, in the above described mechanism there is no reliance upon compression of the mitigating strip 122 nor is there any reliance upon plastic deformation. Instead, the thickness of the strip 122 remains constant as it passes through the various rollers (which act as a guide more than an obstruction). The system relies on utilising the elastic tolerances of the metal so as to ensure it will bend around and through the roller system. In other words it is the diversion of the metal through the rollers that provides the resistance to the forces.

As well as reducing the G-force experienced by the occupant, the absorption mechanism also provides a very controlled rate of bending of the strip 22 and hence a very controlled limitation on the G-forces experienced by the occupant. This is desirable since even a very short term spike in acceleration force experienced by the occupant can be fatal. Furthermore, the simple design of the absorption mechanism allows it to be easily adapted to absorb different magnitudes of acceleration and/or for a different mass of occupant.

As well as the control provided by the absorption mechanism, the guide rollers 18 and guide tracks help to further control movement of the seat 16 relative to the support frame 12 in the event of an explosion.

The mitigating strip and anvil is relatively easy to install into an existing vehicle. It also has the advantage of requiring a minimal amount of space. This is in contrast to prior art crumple systems which are, by their nature, inherently tall thereby causing problems when the maximum height of the seat is limited.

Modifications and improvements may be made to the foregoing, without departing from the scope of the invention, for example:—

Figure 9A:
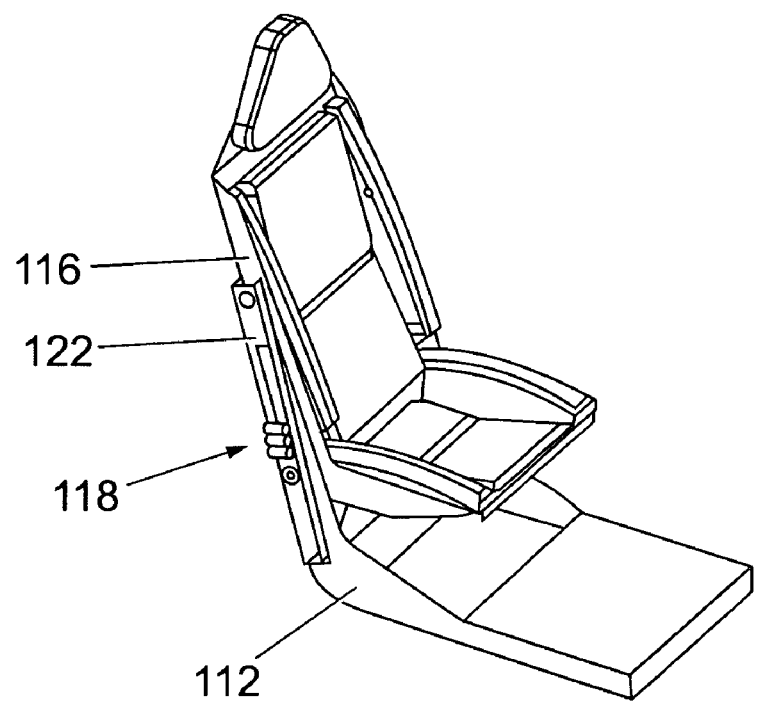
FIG. 9A is a front perspective view of an alternative embodiment of the apparatus where the absorption apparatus is located at either side of the seat member.
Figure 9B:
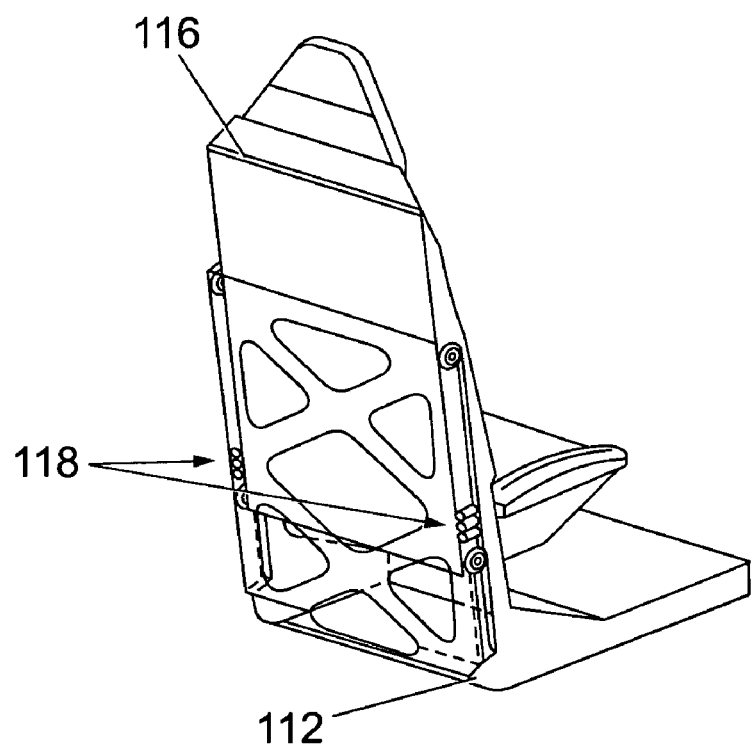
FIG. 9B is a rear perspective view of the apparatus shown in FIG. 9A.

As shown in FIGS. 9A and 9B, in an alternative embodiment of the invention the absorption mechanism previously mounted at the rear of the seat is instead mounted at either side of the seat 116. This is advantageous in vehicles which have a limited amount of space behind the seat 116. In this embodiment the rollers 118 are also mounted on the seat member 116 and run in c-shaped guide tracks on the frame 112. The mitigating strip 122 is attached to the seat 116 and the rollers 118 are attached to the seat frame 'c' shaped guide tracks.

The term "occupant" has been used to describe the payload in the seat 16. This is not intended to limit the invention to protecting a person to G-forces, and could, for example, include protecting sensitive electronic equipment from such forces.

The strip 22 in the embodiments described is only anchored to the support frame 12 above the anvil arrangement 26, 28, 30; however, it could also be attached to the support frame 12 at a point below this arrangement.

The invention claimed is:

1. Energy absorption apparatus protecting occupants from the effects of excessive G-force by absorbing energy imparted on a vehicle during an explosion occurring below that of the vehicle, the energy absorption apparatus comprising:
   a first mounting member attached to the vehicle;
   a second mounting member attached to the occupant's seat;
   an absorption mechanism attached between the first and second mounting members, wherein the absorption mechanism comprises at least a mitigating strip provided on one of the mounting members and an anvil provided on the other of the mounting members such that when the vehicle, and hence the first mounting member, is subjected to an excessive G-force, the mitigating strip is bent and pulled over the anvil, the mitigating strip comprising a portion at one end of the strip for anchoring the strip against movement relative to the first or second member and a portion of substantially constant resistance to bending at the other end of the strip, wherein a portion of gradually increasing resistance to bending is provided between the anchoring portion and the portion of substantially constant resistance to bending such that the resistance to bending of the mitigating strip over the or each anvil increases as the portion of gradually increasing resistance is pulled over the or each anvil until the portion of substantially constant resistance to bending reaches the or each anvil, at which point the resistance to bending of the mitigating strip will remain substantially constant as it is pulled over the or each anvil.

2. Apparatus according to claim 1, wherein a plurality of spaced apart anvils is provided in order to increase the degree of bending required by the mitigating strip as it passes over the anvil.

3. Apparatus according to claim 1, wherein three spaced apart anvils may be provided and the mitigating strip woven over a side of the first anvil, under a side of the second anvil and over a side of the third anvil.

4. Apparatus according to claim 3, wherein the plurality of anvils may be provided as a pair of anvils on either of the mounting members and an intermediate third roller on the other of the mounting members.

5. Apparatus according to claim 4, wherein the or each anvil may comprise a cylindrical roller rotatable about a central axis as the mitigating strip passes over a surface of the or each anvil.

6. Apparatus according to claim 5, wherein guide means is provided in the form of guide rollers adapted to run along a guide track in order to assist controlled relative movement of the first and second mounting members due to the excessive G-force.

7. Apparatus according to any of claims 1-6, wherein the mitigating strip is of a dimension and material which bends past the or each anvil when an excessive G-force is imparted on the vehicle but maintains the first and second mounting members in substantially fixed relationship when no such excessive G-force is present.

8. Apparatus according to claim 1, wherein the first mounting member comprises a support frame rigidly fixed to a portion of the vehicle chassis and the second mounting member comprises a seat back frame forming a portion of the occupant's seat.

9. Apparatus according to claim 8, wherein the first and second members are aligned with one another along an axis which is angled relative to the vertical axis.

10. Apparatus according to claim 1, wherein the excessive G-force is a result of an upward acceleration force caused by an explosion and resulting blast occurring below the vehicle chassis.

11. Apparatus according to claim 1, wherein the portion of substantially constant resistance to bending has a substantially uniform cross sectional area and the portion of gradually increasing resistance to bending has a gradually increasing cross sectional area.

12. Apparatus according to claim 11, wherein the portion of substantially constant resistance to bending has a substantially uniform width and the portion of gradually increasing resistance to bending has a gradually increasing width.

13. Apparatus according to claim 12, wherein the first portion also has a portion of substantially constant width and wherein the two portions of substantially constant width at either end of the strip are linked by a portion of gradually decreasing width which is followed by the portion of gradually increasing width.

14. A method of protecting a vehicle occupant from the effects of excessive G-force by absorbing energy imparted on a vehicle during an explosion occurring below the vehicle, the method comprising:

providing a first mounting member attached to the vehicle;

providing a second mounting member attached to the occupant's seat;

providing an absorption mechanism between the first and second mounting members, wherein the absorption mechanism comprises at least a mitigating strip comprising a portion at one end of the strip for anchoring the strip against movement relative to the first or second member and a portion of substantially constant resistance to bending at the other end of the strip, wherein a portion of gradually increasing resistance to bending is provided between the anchoring portion and the portion of substantially constant resistance to bending, the mitigating strip being provided on one of the mounting members and an anvil provided on the other of the mounting members such that when the vehicle, and hence the first mounting member, is subjected to an excessive G-force, the resistance to bending of the mitigating strip over the or each anvil increases as the portion of gradually increasing resistance is pulled over the or each anvil until the portion of substantially constant resistance to bending reaches the or each anvil, at which point the resistance to bending of the mitigating strip will remain substantially constant as it is pulled over the or each anvil.

* * * * *